No. 840,044. PATENTED JAN. 1, 1907.
C. L. COLLINS, 2D.
METHOD OF ELECTRICALLY HEATING MATERIALS.
APPLICATION FILED DEC. 1, 1905.
Fig. 1.
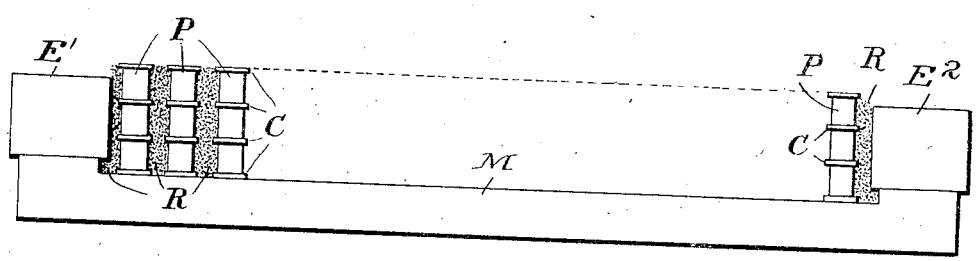
Fig. 1.ª
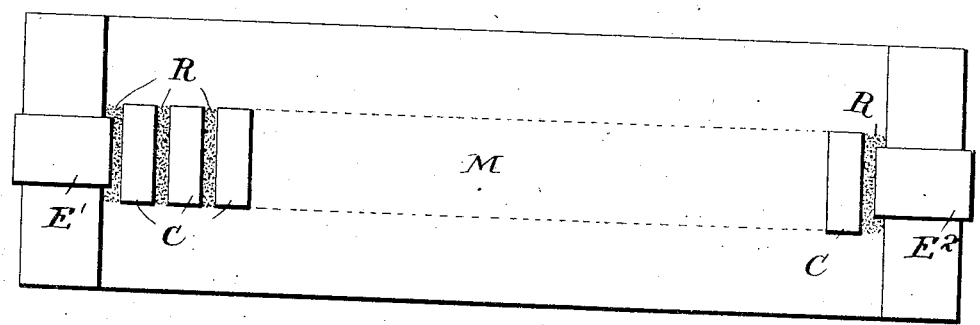
Fig. 2.     Fig. 3.     Fig. 4.
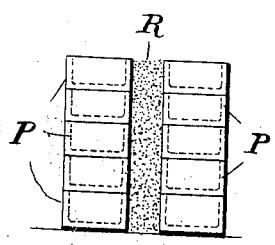 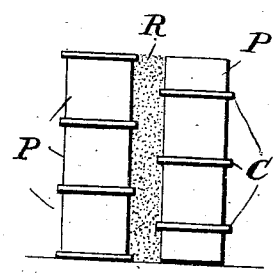 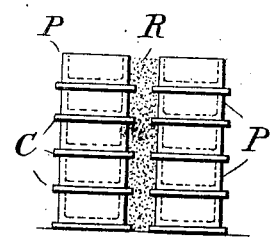

UNITED STATES PATENT OFFICE.

CLARENCE L. COLLINS, 2D, OF NIAGARA FALLS, NEW YORK.

METHOD OF ELECTRICALLY HEATING MATERIALS.

No. 840,044.        Specification of Letters Patent.        Patented Jan. 1, 1907.

Application filed December 1, 1905. Serial No. 289,864.

*To all whom it may concern:*

Be it known that I, CLARENCE L. COLLINS, 2d, a citizen of the United States, residing at Niagara Falls, Niagara county, State of New York, have invented certain new and useful Improvements in Methods of Electrically Heating Materials, of which the following is a specification.

The invention relates to a method of electrically heating materials, particularly such as are relatively poor conductors of electricity, and in this heating so distributing the heat generated throughout the materials under treatment that a given reaction or effect can be produced with great uniformity in large masses with, when desired or necessary, an accurate temperature adjustment between narrow limits.

Most reactions or effects now being produced by means of resistance or incandescent furnaces must be carried on between definite limits of minimum and maximum temperature. In the simplest type of resistance-furnace—namely, the single cylindrical-core incandescent furnace—the heat is generated in the core or resister, which becomes the point of highest temperature. The outer surface of this resister, which may be termed the "surface of productive-heat-diffusion," is the surface through which by conduction, radiation, or convection the heating is transferred to the materials under treatment. The heating or supply of energy must be so regulated that the surface of productive-heat diffusion does not exceed the maximum temperature at which the desired reaction or effect takes place.

From the surface of productive-heat diffusion there is a gradual fall in temperature outward through the furnace in the surrounding materials under treatment until at some definite distance away from the resister and entirely enveloping that body a second surface is reached which is at the minimum temperature of the reaction or effect. Between these two surfaces lies the zone of useful work, wherein the materials under treatment are converted into the finished product. Beyond the outer surface or isothermal of minimum temperature must necessarily lie materials which are heated without being converted into finished product. The heating beyond this surface of minimum temperature usually represents, therefore, wasted or dissipated energy, which becomes greater in proportion to the useful energy the higher the temperature at which the reaction or effect takes place and the closer the limits between the values of minimum and maximum temperatures. The outer surface of minimum temperature may be termed the "surface of non-productive-heat diffusion."

In the single-resister incandescent furnace the surface of non-productive-heat diffusion must necessarily be larger than the surface of productive-heat diffusion, as the latter envelops merely the resister, whereas the former envelops not only the resister, but also the surrounding zone of useful work where the finished product is obtained. As it can be shown that the efficiency of different styles of resistance-furnaces, other things being equal, will vary directly with the ratio that the surface of productive-heat diffusion bears to the surface of non-productive-heat diffusion, any increase in this ratio will result in a smaller expenditure of energy per unit of product obtained. Furthermore, in a single-resister furnace, first, the heat generated must be transferred to the outer regions of the zone of useful work through a definite thickness of product already formed or in process of formation, which inherently necessitates the superheating of the region nearest the resister, and, secondly, to form the thickness or volume in question the reaction or effect is not produced instantaneously, but progressively throughout the mass, both features introducing a definite time factor for the total operation, with its attendant evil of a greater amount of wasted energy (from the surface of non-productive-heat diffusion) per unit of product obtained.

With a furnace of a given size this time factor, and hence the waste energy, can be decreased per unit of product obtained by increasing the rate at which the energy is supplied per unit of surface of productive-heat diffusion; but if this is done the thickness to which the product will form must necessarily be decreased if the surface of productive-heat diffusion is not allowed to exceed the maximum temperature at which the reaction or effect can take place. There is then a lesser volume of product formed in the furnace as a whole, and although the thermal efficiency is increased the labor costs are not decreased in proportion to the lesser volume obtained, and we soon reach a point where it is no longer economical to increase the rate at which the energy is supplied per unit of surface of productive-heat diffusion. This may be termed the "maximum efficient rate of energy-supply per unit of surface of productive-heat diffusion" and may be determined by other conditions than labor costs in processes where a definite period of time is necessary to produce a given reaction or effect requiring a definite expenditure of energy, thus limiting the rate at which the energy can be supplied. The natural step is then an effort to increase the surface of productive-heat diffusion.

If instead of being circular the same volume of resister is made very flat—that is, very thin and wide with the same length—we increase the surface of productive-heat diffusion. Hence with a larger total expenditure of energy per unit of time we can increase the total volume of product formed in a given time without exceeding the maximum efficient rate of energy-supply per unit of surface of productive-heat diffusion. This may possibly decrease the labor costs per unit of product obtained; but the thermal efficiency remains practically the same, as the surface of non-productive-heat diffusion would increase in the same proportion as the surface of productive-heat diffusion.

Theoretically with a given volume to be converted into product all contained within a given area of surface of non-productive-heat diffusion the best efficiency is obtained if the heating is infinitely distributed throughout the mass under treatment, each particle to be acted upon being in contact with its particular resister or other source of heat generation, with good heat conductivity between the two. Then with the maximum efficient or permissible rate of supply of energy in each particular resister the action is simultaneous and instantaneous throughout the mass, with no superheating of part of the charge and with a minimum opportunity for the conduction, convection, and radiation of waste energy from the surface of non-productive-heat diffusion. In practice various improvements have been suggested over the single-resister incandescent furnace, such as the multiple-core furnace, as also furnaces in which the core is zigzaged through the materials under treatment. In all of these the object in view is both an increase in the proportion that the surface of productive-heat diffusion bears to the surface of non-productive-heat diffusion and a more uniform distribution of the heat generated through the materials under treatment, thus obtaining a better efficiency per unit of product obtained; but all possess to a greater or less degree difficulties of either construction or operation.

In zigzaging a core the leakage of current through the materials under treatment is in many cases serious, especially if the operation is carried on at high temperatures. The path for the current through the materials is shorter and more direct than around through the core. Such leakage tends to decrease the heating effect of the core itself and if serious may even prevent that temperature being reached which is necessary for the reaction in question.

In the multiple-parallel resister-furnaces, especially with more than two resisters, it is almost impossible to construct the resisters of the same conductivity, so that each takes its proper proportion of the total energy. The cores may even vary in conductivity along their length, thus resulting in a further unequal distribution of the heat generated.

The process now described covers a type of furnace in which the surface of productive-heat diffusion of the resister can be increased to almost any value without increasing the surface of non-productive-heat diffusion. The heating can be subdivided to almost any degree and can be uniformly and evenly distributed throughout the mass under treatment, thus allowing of the treating of large volumes of materials with large amounts of total energy without danger of exceeding the maximum temperature limit or the maximum economical rate at which the energy should be supplied per unit of surface of productive-heat diffusion. The time required to manufacture a given volume in consequence of this distribution can be reduced to a minimum, thereby decreasing the waste energy from the surface of non-productive-heat diffusion. By increasing the surface of productive-heat diffusion of the resister its total volume is not necessarily increased, and as the total energy required to bring it to the desired temperature is therefore the same and as greater amounts of energy can now be used in the furnace as a whole and greater volumes of product manufactured the energy which must be supplied to heat the resister per unit of product obtained is decreased. By the greater and more uniform distribution of the energy throughout the mass the energy required for superheating part of the mass under treatment is decreased per unit of product obtained, the current is given a direct path through the materials, thereby decreasing any leakage, and, finally, in accomplishing these results no difficulties of construction or operation are introduced. The total result is a considerable decrease in the energy required to manufacture a unit volume of product.

The accompanying drawings illustrate typically an apparatus which may be used in carrying out the process.

Figure 1 is a side view, partly in section, of a furnace, showing the manner of arranging the materials therein. Fig. 1ª is a plan view of the same; and Figs. 2, 3, and 4 are detail views showing modifications.

In heating mixtures in the type of furnace here described the materials used, if not already in powdered or granular form, are preferably first ground and then molded into blocks P of a predetermined size, using some such bond as pitch, tar, or glue water, or, in certain types of heating, such as in vitrifying bricks, the articles are already in convenient form for handling. These are then placed in the furnace in tiers, as shown in Fig. 1, the bed of the furnace between the electrodes $E_1$ and $E_2$ having been first filled with some good refractory material M which is a poor conductor of heat and electricity and which may or may not be of the same character as the material under treatment. Thin slabs C of some material which is preferably a relatively good conductor of heat and electricity—such as graphite or carbon, or even some metal, if the temperature of the reaction is low—are placed between the blocks P. By means of spacing-sticks of a given size the tiers are kept at a definite distance apart as the furnace is being loaded. When all the tiers are in, boards or sheets of iron are placed along the sides and all the spaces between the tiers filled in with the resistance material R and the spacing-sticks removed. The outer side walls of the furnace are then built up, and the space between these and the tiers is completely filled in with the refractory material M. The sheets of iron, if used along the sides of the tiers, are then removed and the top of the furnace covered with the material M to a sufficient thickness to give proper heat insulation.

The resisters in this type of furnace, if the slabs C are of high electrical conductivity, are a series of thin zones of heating placed practically at right angles to the axis of the furnace or to the main direction in which the current flows. The connecting-slabs C not only complete the electrical circuit between the zones of heating, but if of high heat conductivity they also act as heat-distributers, tending to increase the surface of productive-heat diffusion of the resisters proper and aiding in the uniformity and rapidity with which the heat is distributed. By making the blocks P of one-half the width and the zones of heating of one-half the thickness the surface of productive-heat diffusion can be practically doubled without increasing the total volume of the resisters or the area of the surface of non-productive-heat diffusion. By still further subdivision within certain practical limits almost any degree of distribution of the heat generated throughout the mass under treatment can be obtained each subdivision resulting in an increase of thermal efficiency without a corresponding proportionate increase in the labor costs or a decrease in the ease of construction and operation.

An advantage possessed by this type of furnace in addition to those mentioned is the fact that if the slabs C possess higher electrical conductivity than the material under treatment the latter is practically short-circuited by these slabs, and hence any change in the conductivity of the blocks P during the run does not materially alter the resistance of the furnace as a whole. The voltage regulation therefore does not require a wide range and the source of electrical supply is a simpler, less expensive style of apparatus than with some other types of incandescent furnaces. Furthermore, the zone of useful work lies within fixed known limits, and in tearing down the furnace after a run a definite separation of the product from the surrounding materials is very easily accomplished. The surrounding heat-insulator M can therefore be of some other materials than those from which the product P is formed without danger of contamination.

If the material under treatment becomes or is liquid or plastic during any stage of the operation, the conductors and heat-distributers between the resisters, as shown in Fig. 2, can be made in the form of shallow troughs with suitable feed and tap holes at the ends beyond the cores, if desired, or, as shown in Fig. 3, the conductors and heat-distributers can be placed between such troughs, if it is desired to make them of some other material. For continuous operation in the heating of certain materials the tiers between the heating zones can be made in the form of hollow spouts through which the material passes.

The blocks P can be made of any shape and any number may be placed in any arrangement between the conductors C, or the spaces between the slabs C can be filled in as the furnace is being loaded with the mixtures or materials under treatment without previous forming. Similarly, the connecting-slabs C may be subject to wide variation without affecting the principle of operation. It is not even necessary that they be placed opposite each other. In fact, with the arrangement shown in Fig. 4 the heating is more uniform throughout each zone of resistance material.

Although I have used as illustration connecting-slabs C of some material which possesses high electrical and high heat conductivity and although for certain classes of work, especially where the product P becomes a relatively good conductor during the furnace-run this is preferable, I do not limit myself to such construction. The connecting-slabs C may also be made of any suitable resistance material and may possess either a higher or a lower specific electrical resistance than the other resistance material R used in the relatively extended transverse sections. If both are resistance materials, as in the case where one is a conductor and the other a resistance material, by proper proportioning of the spacing between the tiers and of the thickness of the slabs C, especially with the arrangement shown in Fig. 4, the generation of heat may be made absolutely uniform at all points around the product P, whether it takes place in the transverse sections R or in the connecting-slabs C. The connecting-slabs C may even be made up of the resistance material R itself by the use of some suitable temporary or permanent bond. In this case the advantage now claimed over the previous known methods of embedding articles in a granular resistance-core lies in a greater ease of construction. By forming part of the core or resistance material into slabs which can be readily handled the material or materials to be treated can be more conveniently arranged in the furnace in tiers definitely spaced with respect to each other in all directions, and then the spaces between tiers are afterward filled in with the balance of the resistance material in a granular, powdered, or loose form, as described above.

What I claim is—

1. The process of electric heating, which consists in providing a resister comprising granular portions relatively extended transversely to the path of the current and of high electrical resistance, and intermediate portions of lower resistance, material to be heated being placed between the high-resistance portions of said resister, and passing an electric current through said resister.

2. The process of electric heating, which consists in providing a resister comprising granular portions relatively extended transversely to the path of the current and of high electrical resistance, and intermediate integral portions of lower resistance, material to be heated being placed between the high-resistance portions of said resister, and passing an electric current through said resister.

3. The process of electric heating, which consists in providing a resister comprising granular portions relatively extended transversely to the path of the current and of high electrical resistance, and intermediate portions of lower resistance, material to be heated being placed between the high-resistance portions and in proximity to the lower-resistance portions of said resister, and passing an electric current through said resister.

4. The process of heating materials which are relatively poor conductors of electricity, which consists in providing a resister comprising granular portions of high electrical resistance, and intermediate portions of lower resistance, material to be heated being placed between the high-resistance portions of the resister, and passing an electric current through said resister.

5. The process of electric heating, which consists in providing a resister comprising granular portions relatively extended transversely to the path of the current and intermediate integral, solid connecting portions, the material to be heated being placed between the granular portions, and passing an electric current through said resister.

In testimony whereof I affix my signature in presence of two witnesses.

CLARENCE L. COLLINS, 2D.

Witnesses:
CHARLES W. COIT.
HENRY S. ELY.